Nov. 27, 1951     B. A. KNAUTH     2,576,518
MECHANISM AND SYSTEM FOR CONTROL THROUGH THYRATRONS
Filed March 8, 1948     2 SHEETS—SHEET 1
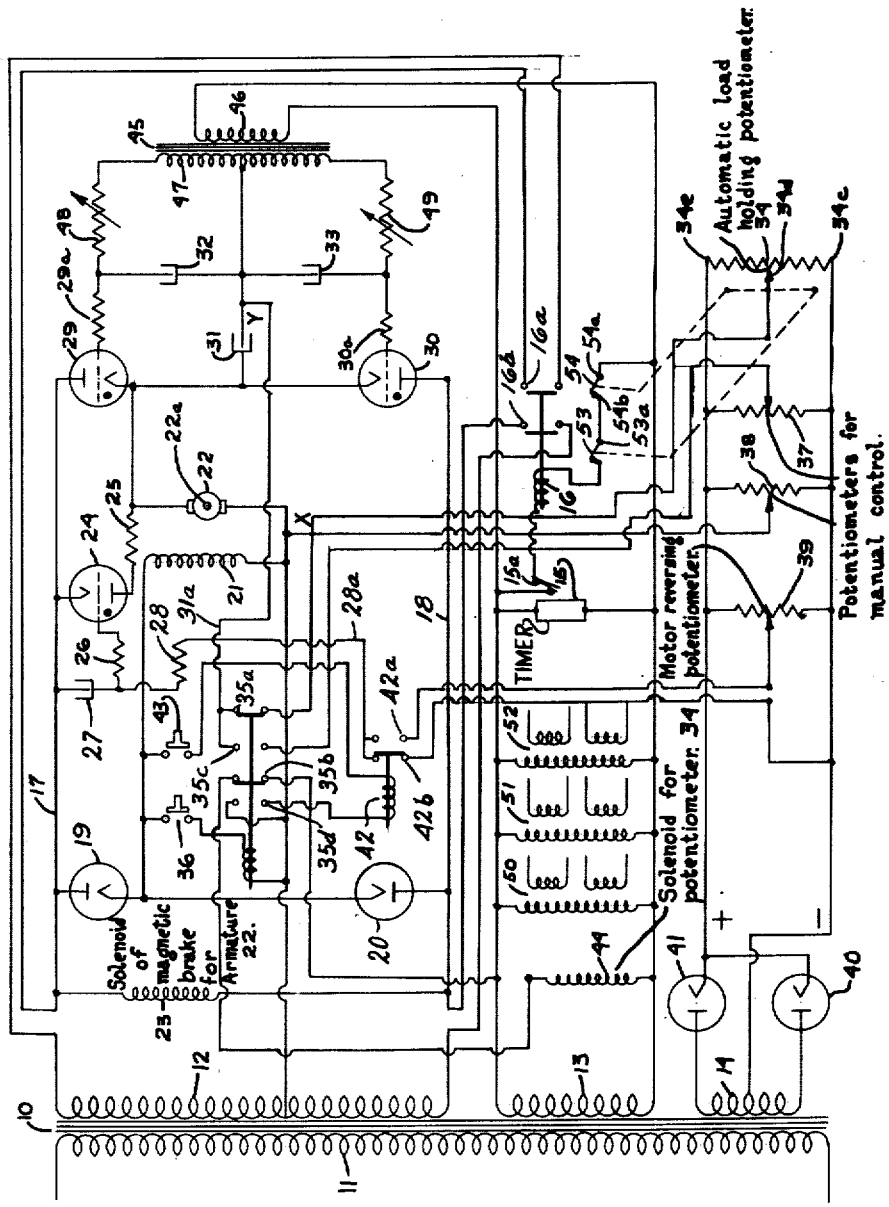
Inventor
BERTHOLD A. KNAUTH
By
Semmes, Keegin, Robinson + Semmes
ATTORNEYS Nov. 27, 1951   B. A. KNAUTH   2,576,518
MECHANISM AND SYSTEM FOR CONTROL THROUGH THYRATRONS
Filed March 8, 1948   2 SHEETS—SHEET 2
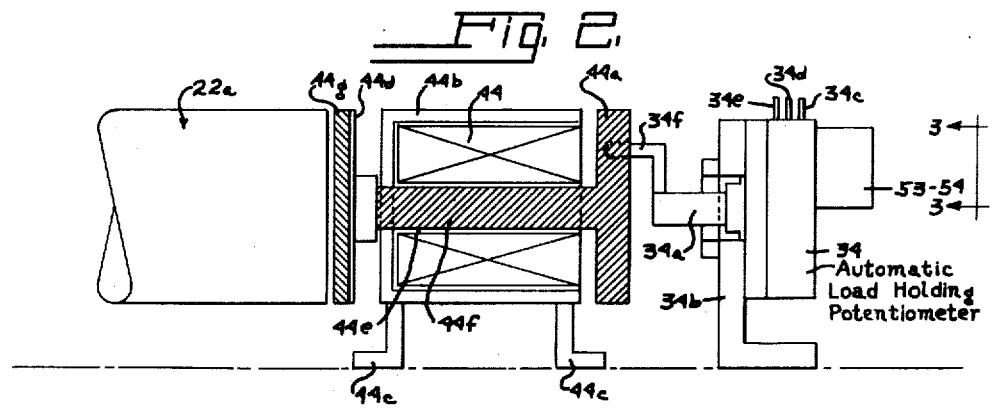
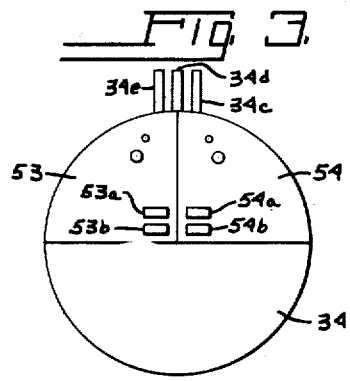
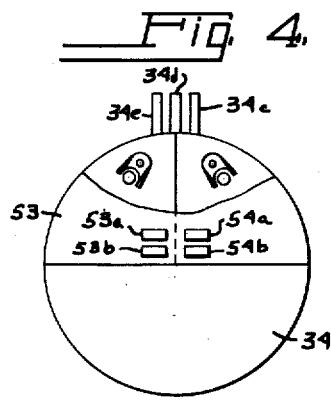
Inventor
BERTHOLD A. KNAUTH
By Semmes, Keegin, Robinson & Semmes
ATTORNEYS Patented Nov. 27, 1951

2,576,518

UNITED STATES PATENT OFFICE 2,576,518

MECHANISM AND SYSTEM FOR CONTROL THROUGH THYRATRONS

Berthold A. Knauth, Bolton, N. Y., assignor to The Motorspeed Corporation, New York, N. Y.

Application March 8, 1948, Serial No. 13,657

12 Claims. (Cl. 318—269)

My invention relates to controlling the firing angle of thyratron tubes in which it has many applications, such as arc-welding, resistance welding, servo mechanisms, the control of the rate of rotation of electric motors, and other applications which will be apparent from the ensuing description.

While the drawings illustrated the system as applied to the control of the rate of rotation of a direct current motor, it will be apparent that the system has many other applications in industry where similar electrical conditions are desired in operating circuits.

An object of the invention is to provde a control system for a motor to allow the motor to exert an amount of torque equal to that applied to the motor shaft by an outside force so that no rotation will result.

Another object of this invention is to provide an apparatus for automatically controlling the rate at which an outside force, acting on the shaft of a motor, shall be able to rotate the motor shaft in a reverse direction to that in which the power supplied tends to cause the motor shaft to rotate.

A further object of this invention is to provide an apparatus for controlling a motor so that the motor controlled therewith will compensate for changes in load at any rate of rotation or even while not rotating.

A still further object of this invention is to provide an apparatus for controlling a motor so that the motor controlled therewith may be used as a brake which will hold a load at any position desired by the operator.

Another object of this invention is to provide a thyratron control apparatus for controlling a motor in which it is possible to set the control grid voltage of the thyratron at a point where driving the rotor of the motor in a reverse direction will cause the thyratron to fire and limit the speed of reverse rotation.

Still another object of this invention is to provide an electromagnetic clutch coupling between the shaft of a motor to be controlled and the potentiometer that controls the grid bias of a thyratron tube through which the rotor of the motor is energized.

Other objects of this invention will be apparent to those skilled in the art to which it relates from the following specification, claims and the drawing.

In controlling the firing of thyratron tubes which are grid controlled gaseous discharge devices that permit the passage of current in only one direction, there are several factors which, in general, affect the firing of the tubes. Control of the output of the tubes can be effected by controlling the firing angle which is dependent on a combination, among others, of the following factors: (1) The grid-to-cathode potential, or grid bias, of the tube as effected by the net instantaneous algebraic sum of the voltage or voltages applied to the grid; (2) The simultaneously occurring anode-to-cathode potential of the tube which is the net instantaneous alegbraic sum of all the voltages applied to the anode, which in this instance includes both the alternating supply voltage and the countner E. M. F. of the motor armature. It it believed to be unnecessary to fully explain the operation of the combination of factors above mentioned.

In this system there is employed means for generating an adjustable direct potential, which is one component of voltage by which the grid of the thyratron tube is biased, and which is derived from the source of alternating current with which the system is supplied, and thus there is obtained an adjustable reference voltage without the use of auxiliary equipment.

The phase shifting of the alternating current potential applied to the grid has been accomplished in a novel manner which gives more complete and accurate control of the operating characteristics of the system than has heretofore been possible.

The feature of this system wherein the D. C. component of the thyratron grid bias can be made negative with respect to the cathode makes it possible to reduce the motor to zero speed, a result which could not have been obtained in the prior art, except by the imposition of an outside negative voltage.

In this system there is provided means for making the D. C. component of grid bias of the thyratron tubes negative with respect to the cathode, to control the speed of the motor when it is running in the reverse direction with a reversed polarity of counter E. M. F., when the thyratron circuit is inverting as distinguished from rectifying. For instance, where the motor is being used in a hoist mechanism, the motor may be allowed to turn in reverse under an outside force and control of the speed of this reverse motion by control of the electrical counter torque on the motor. In this instance, the system operates as a brake and governor when the motor is turned in reverse by, for instance, the weight of the load on the cable of the hoist mechanism. In reverse, the motor, in paying out under a load which causes it to rotate in reverse, creates an E. M. F. which tends to make the net D. C. component of grid voltage of the thyratron tube positive. This tends to fire the tube for a forward motion of the motor, so to control the firing of the tube for this reversed motion, there is imposed an additional negative potential in the thyratron grid circuits which can be made of a desired value to control automatically the speed of the motor turning in reverse, thus acting as an automatic governor or speed limiter. The magnitude of the current supplied to the motor armature by the thyratron tubes is then a function of the reverse speed of rotation which is caused by the outside turning force, (i. e., gravity acting on the load in the present instance) and the electromagnetic torque necessary to limit the speed to this pre-set value.

In the drawings:

Figure 1 is a schematic wiring diagram of an embodiment of this invention; and

Figure 2 is a view in side elevation of the potentiometer and the electromagnetic clutch for coupling the potentiometer to the motor shaft; and Figure 3 is an end view of the potentiometer taken along the line 3—3 of Figure 2; and Figure 4 is an end view in partial section of the potentiometer actuated switches shown in Figure 2.

In Fig. 1 the transformer 10 is provided with a primary winding 11 and three secondary windings 12, 13 and 14. The winding 13 is connected to energize the timer 15 which may be of conventional design such as a dashpot relay with which are mechanically associated the contacts 15a that are closed as soon as the timer functions. In series with the timer contacts 15a is connected the winding 16 of a relay controlling the contacts 16a and 16b connected to the lines 17 and 18, respectively, leading from the secondary 12. Rectifiers 19 and 20 are connected with their anodes to the lines 17 and 18, respectively, and with their cathodes together to the motor field winding 21 of the motor having the armature 22. The solenoid 23 of the solenoid operated brake (not shown) for the motor 22 is also connected across the lines 17 and 18. This is a safety brake operative on power failure when contacts 16a and 16b are open.

The cathode of the thyratron 24, which supplies current for driving the armature 22 in reverse, is connected to the line 17; the anode is connected to the resistor 25 leading to the armature 22 of the motor, and the grid is connected to the grid current limiting resistor 26 leading to the phase shifting circuit including the capacitor 27 and the resistor 28. The anodes of the thyratrons 29 and 30, which both supply current for driving the armature 22 in the forward direction, are connected to the lines 17 and 18 respectively and the cathodes of these thyratrons are connected together to the armature of the motor 22 and the anode resistor 25 of thyratron 24.

The cathodes of the forward thyratrons 29 and 30 are also connected to one terminal of the capacitor 31. The other terminal of this capacitor 31 is connected to a terminal of each of the capacitors 32 and 33 and to the line 31a to the variable contact of the potentiometer 34, through the normally closed contact 35a of the relay whose solenoid is shown at 35 and which operates contacts 35a, b, c and d. Solenoid 35 is connected in series with the forward control switch 36 across the field 21 of the motor. The line 31a is also connected to the normally open contact 35c of the relay 35 and this contact 35c is connected to the variable element of the potentiometer 37. Potentiometers 34 for automatic load holding, 37 and 38 for manual control, and 39 for motor reversing are connected across a source of rectified A. C. supply provided by the diametric (full-wave) rectifier including the tubes 40 and 41 connected with their cathodes together and their anodes to the respective ends of the center tapped secondary winding 14.

The common connection of the field 21 and the rotor 22 of the motor is connected to the variable element of the manual control potentiometer 38, and the variable element of the manual control potentiometer 39 is connected to the normally open contact 42a of the reverse relay whose solenoid 42 is connected in series with the reverse switch 43 and the normally open contacts 35d of the relay 35. The grid control resistor 28 is connected by the line 28a to the normally closed contact 42b so that negative potential is applied to the grid of the thyratron 25 with respect to the cathode. The line 28a is also connected to the normally open contact 42a of relay 42.

The clutch solenoid 44 mechanically associated with the automatic load holding potentiometer 34, is connected across the secondary winding 13. The primary 46 of the transformer 45 is also connected across the secondary 13. Transformer 45, as will be later described, furnishes a source of potential in the phase shifting network of the grid circuits of thyratron tubes 29 and 30 that furnish power to the armature 22 of the motor for forward movement.

The filament heating transformers 50, 51 and 52 that are provided for heating the filaments or the heaters associated with the cathodes of all the tubes in my system, namely, 19, 20, 24, 29, 30, 40 and 41. The tubes 19 and 20 are provided with a common cathode as are also the tubes 40 and 41 since these respective tubes may be grouped in common envelopes. Furthermore, suitable secondary windings may be provided to the transformer 10 for heating the filaments or the cathode heaters of the aforesaid tubes, if desired, instead of the transformers 50, 51 and 52.

The secondary 47 of the transformer 45 is connected to the phase shifting network in the grid circuits of the thyratrons 29 and 30. This phase shifting network includes the variable resistors 48 and 49 and the capacitors 32 and 33, and from this network is obtained the A. C. grid voltage component that is shifted approximately 90 degrees lagging in phase with respect to the anode voltage of the thyratrons.

In Figure 2 is illustrated a view of the potentiometer 34 and the electromagnetic clutch 44 for coupling the slider of this potentiometer to the end of the shaft 22a of the motor armature 22. This apparatus consists of the potentiometer 34 provided with a suitable casing, a shaft 34a for actuating the potentiometer slider, a supporting bracket 34b, and terminals 34c, 34d and 34e (see also Figure 1). The limit switches 53 and 54 (see also Figure 1) having terminals 53a, 53b and 54a, 54b, respectively may also be mounted on the back plate of the potentiometer 34. These switches are actuated through mechanically coupling them to the slider of the potentiometer in the well known manner. Switches that are actuated at one end of motion of the potentiometer slider are well known in the art. In the present case a second switch is added to be actuated at the other limit of movement of the slider in the same manner as the first switch is actuated, as illustrated generally without detail in Figures 3 and 4.

The crank 34f, attached to the shaft 34a of the potentiometer, engages a hole formed in the magnetic disc 44a associated with a magnetic armature 44f extending through a bearing 44e positioned in an open ended magnetic housing 44b which is supported by brackets 44c. The end of the magnetic armature 44f nearest the shaft 22a of the motor is attached to a disc 44d that is faced with a friction disc 44g to function as a clutch cooperating with the end of the motor shaft 22a.

When the solenoid 44 is energized it sets up a magnetic field around the turns thereof whereupon the magnetic disc 44a is drawn in toward the open end of the solenoid housing and the friction disc 44g is brought into frictional engagement with the end of the shaft 22a of the motor armature so that the slider of the potentiometer may be adjusted in accordance with the rotation of the motor armature for the purpose described in the preceding paragraphs.

I shall now explain what happens when this system is operated. First the system will be operated to hold a load automatically.

With the application of potential to the primary winding 11 of transformer 10, a voltage appears across the terminals of the secondary 13 and timer 15. This timer 15, which delays the closing of its contacts 15a for about one minute, allows the filaments of the various tubes 19, 20, 24, 29, 30, 40 and 41 to heat up to operating temperature through the operation of the filament heating transformers 50, 51 and 52. A voltage also appears across secondary 14 and the tubes 40 and 41, but these rectifiers have an instantaneously heated filament and do not have to supply anything but voltage to the potentiometers, 34, 37, 38 and 39 for control purposes so the voltage across these rectifiers is not very high or the current through them very large.

When the contact 15a of the timer 15 is closed relay 16 becomes energized. This relay 16 closes the contacts 16a and 16b and releases the solenoid 23 of the magnetic brake for the motor shaft 22a of the armature 22. Power is now also supplied to the anodes of the rectifier tubes 19 and 20, which tubes in turn energize the field winding 21 of the direct current motor. Voltage is also supplied to the cathode of the reverse firing thyratron 24 and to the anodes of the forward firing thyratrons 29 and 30. Since the grid of the reverse firing thyratron 24 is connected directly to the negative side of the rectifiers 40, 41 through the normally closed contact 42d no current will flow through the thyratron 24.

The solenoid 44 of the holding device associated with the potentiometer 34 is energized by the current from the secondary winding 13 through the normally closed contact 35b of relay 35. Thus the slider of the load holding potentiometer 34 is adapted to turn with the motor shaft 22a.

This slider is also connected electrically to the grids of the thyratrons 29 and 30 through the normally closed contacts 35a of the relay controlled by solenoid 35. Therefore, if this potentiometer slider voltage is sufficiently positive that conduction in forward firing thyratrons 29 and 30 begins, the motor armature 22 will start in a forward direction until the slider of potentiometer 34 is turned by the motor through the magnetic clutch, that is solenoid 44, to a point where conduction ceases or drops to a negligible minimum. The motor armature 22 then stops. Conversely, if the motor is connected to a mechanical load, such as a hoist, and if a load is suspended from the hoist sufficient to cause the hoist to turn backward, then the motor armature will turn and the slider of the potentiometer 34 will be moved toward the positive side of the potentiometer winding until the tubes 29 and 30 begin to conduct. In this way a state of equilibrium is achieved in which the tubes 29 and 30 continually fire but the motor armature 22 does not move. It may be worth while to point out that the absence of tendency to hunt under the above circumstances is one of the chief advantages of this device.

I will now describe the operation of my system when manual control is utilized. With my controlling system energized, and with an empty hook on the winch, the operator hooks onto a load. He depresses the forward button 36 and this energizes the solenoid 35 of the relay embodying that solenoid, this in turn opens contact 35a, and closes contact 35c so that manual control potentiometer 37 instead of automatic load holding potentiometer 34 controls the firing of thyratrons 29 and 30. Potentiometer 37 is incorporated in the control handle of the hoist (not shown) and is spring biased to turn to the negative side of the winding. There is also a detent device to let the operator know when the slider of potentiometer 37 is at a point where the tubes 29 and 30 just fire slightly. Potentiometer 34 is now disconnected mechanically from the shaft armature 22 because of the fact that normally closed contact 35b of the relay embodying solenoid 35 has been opened, and the clutch solenoid 44 released. The automatic load holding circuits are now no longer operative and manual control is in effect.

The operator now presses the control handle into which is incorporated the potentiometer 37 so that this potentiometer slider is moved toward the positive side of the potentiometer winding until the detent point is met. Here the tubes 29 and 30 fire sufficiently to start the motor armature 22 running slowly forward. As the motor advances the winch or hoist, the load due to the weight of the hook, tends to slow the motor down. However, due to the change in wave form brought about by the load on the motor shaft, the firing angle of the tubes 29 and 30 is now automatically increased and the speed of the motor armature is maintained practically constant. This is a great advantage to the operator because often the load sticks slightly, or hangs to something, and to break it loose the operator must apply more voltage. Then when the load is loosened, the hoist has a tendency to run away until the operator can adjust the voltage.

Having now the load in motion, the operator can manually operate the control handle to increase the positive bias on potentiometer 37 to increase the speed of the motor armature 22. Having proceeded far enough with the hoisting, the operator allows the control handle to return the potentiometer 37 slider to the detent position and the motor to slow down to almost zero speed. The operator then releases the forward button 36 and relay whose solenoid is 35 is de-energized; automatic load holding potentiometer 34 then takes control through the clutch and solenoid 44, and the previously described equilibrium condition is resumed and the load held automatically.

To lower the load the operator again moves the control handle so that the potentiometer 37 slider is moved to the aforesaid detent point, and presses the forward button 36. Next the operator releases the control handle so that the slider of potentiometer 37 moves toward the negative side of the winding, causing the forward thyratron tubes 29 and 30 to furnish decreased power to the motor. When this happens, the load on the winch tends to unwind the cables and to turn the motor backward. This turning of the motor generates a potential which appears on the grid side of the capacitor 31, as a positive voltage. When this voltage assumes a sufficient magnitude, the tubes 29 and 30 begin to conduct sufficient electric current to tend to hold the turning of the motor armature 22 in the reverse direction. The amount of braking is more than proportional to the rate of rotation of the motor armature 22 so that another equilibrium state influenced by the setting of the slider of potentiometer 38 is reached. The rate of lowering thus becomes a function of the setting of the slider of potentiometer 38. It will be seen that if the sliders of potentiometers 38 and 37 be set at the precise center of their respective windings, no voltage will appear across points X and Y. However, point Y will become positive with respect to point X if the slider of potentiometer 37 be moved upward, and negative if it is moved downward.

I will now describe the operation of my system to cause the motor to turn in reverse under its own power.

Assuming that the load on the hook of the winch is not great enough to cause the winch to unwind and the armature 22 of the motor to reverse, the operator depresses the forward button 36 and next also presses the reverse button 43. When the operator does this, contact 42b of relay 42 is opened and contact 42a is closed. The grid of tube 24 is then controlled by the slider of potentiometer 39, and if this is set somewhat positive with relation to the slider of potentiometer 38 tube 24 will conduct electric current through the resistor 25. Since the cathode and anode of this tube 24 are reversed with regard to those of forward firing tubes 29 and 30 the motor armature 22 will be caused to turn in the reverse direction. When the motor reaches a certain speed, depending on the relative settings of potentiometers 38 and 37, the forward tubes 29 and 30 will begin to conduct and thus again limit the rate of power lowering.

Even if reverse tube 24 and forward firing tubes 29 and 30 fire at the same time, the amount of current therethrough will be limited by the resistor 25 so that no damage results. Also, tube 24 only supplies current to the motor during half the A. C. cycle while tubes 29 and 30 supply full wave current. Also, as the speed of the armature 22 increases in the reverse direction, the tube 24 automatically ceases to fire. Thus the position of the slider of potentiometer 37 on the control handle still governs the direction of rotation of the motor armature regardless of the position of the relays embodying solenoids 35 and 42.

As a result of all these functions of the various components of this device, the service brake, or lowering brake, of the usual hoist or elevator is eliminated entirely. In the event of power failure, the magnetic brake embodying the solenoid 23 is automatically made effective and the motor halted. The lowering speed can be made constant regardless of load, and this feature will have a number of other applications.

The function of the limit switches 53 and 54 in series with relay 16 is to make the magnetic brake embodying solenoid 23 effective by causing relay 16 to open contacts 16a and 16b in the event that movement of the slider of automatic load holding potentiometer 34 into the automatic holding position does not result in conduction or cessation of conduction in tubes 29 and 30. These switches 53 and 54 are mechanically coupled to the slider of the potentiometer 34 so that turning this potentiometer slider all the way in either direction will cause one of these switches 53 or 54 to open and to make the relay embodying solenoid 16 drop out and contacts 16a and 16b to open.

While I have shown my system as applied to a hoist mechanism, it will be obvious that the system is useful in many other connections, and that the immediate application has been illustrated and described merely to illustrate the invention. I desire that my invention be limited only by the scope of the appended claims and the showing of the prior art.

I claim:

1. A thyratron control system for controlling a direct current motor comprising thyratrons each having an anode, a grid and a cathode, a direct current motor having an armature connected in series with said thyratrons across an alternating current supply, phase shifting circuits connected between the grids of said thyratrons and said alternating current supply, a source of direct current supply, a pair of potentiometers connected to said source of direct current supply, a magnetic clutch for mechanically coupling the variable contact of one of said potentiometers to the shaft of said motor armature, a relay for connecting the variable contact of said last mentioned potentiometer to said phase shifting circuit for automatic control of the grid bias of said thyratron, and connections for connecting the contactor of the other of said potentiometers to the cathode of said thyratron.

2. A thyratron control system for controlling a direct current motor comprising thyratrons each having an anode, a grid and a cathode, a direct current motor having an armature connected in series with said thyratrons across an alternating current supply, a phase shifting circuit connected between the grids of said thyratrons and said alternating current supply, a source of direct current supply, a potentiometer connected to said source of direct current supply, a magnetic clutch for mechanically coupling the variable contact of said potentiometer to the shaft of said motor armature, connections for connecting the variable contact of said potentiometer to said phase shifting circuit for automatic control of the grid bias of said thyratron, and connections for connecting said direct current supply to the cathode of said thyratron.

3. A thyratron control system for controlling a direct current motor comprising thyratrons each having an anode, a grid and a cathode, a direct current motor having an armature connected in series with said thyratrons across an alternating current supply, phase shifting circuits connected between the grids of said thyratrons and said alternating current supply, a source of direct current supply, a pair of potentiometers connected to said source of direct current supply, a magnetic clutch for mechanically coupling the variable contact of one of said potentiometers to the shaft of said motor armature, a relay for connecting the variable contacts of one of said potentiometers to said phase shifting circuit for automatic control of the grid bias of said thyratron, manual means for controlling the other of said potentiometers, and connections for connecting said direct current supply to the cathode of said thyratron.

4. A thyratron control system for controlling a direct current motor comprising thyratrons each having an anode, a grid and a cathode, a direct current motor having an armature connected in series with said thyratrons across an alternating current supply, phase shifting circuits connected between the grids of said thyratron grid and said alternating current supply, a source of direct current supply, a plurality of potentiometers connected to said source of direct current supply, a magnetic clutch for mechanically coupling the variable contact of one of said potentiometers to the shaft of said motor armature, means for connecting the variable contacts of said last mentioned potentiometer to said phase shifting circuit for automatic control of the grid bias of said thyratron, connections for connecting the variable contact of another of said potentiometers to the cathode of said thyratron, another thyratron connected to said motor armature in reverse direction to that in which said first mentioned thyratrons are connected for reversing the direction of rotation of said armature, and means for connecting said direct current supply to the grid of said second thyratron.

5. A thyratron control system for controlling a direct current motor comprising a thyratron having an anode, a grid and a cathode, a direct current motor having an armature connected in in series with said thyratron across an alternating current supply, a phase shifting circuit connected between said thyratron grid and said alternating current supply, a rectifier for producing a rectified voltage supply from said alternating current supply, a pair of potentiometers having the windings thereof connected across said rectified voltage supply and connections for connecting the variable contact of one of said potentiometers to said armature, and the variable contact of the other of said potentiometers to said phase shifting circuit.

6. A thyratron control system for controlling a direct current motor comprising a thyratron having an anode, a grid and a cathode, a direct current motor having an armature connected in series with said thyratron across an alternating current supply, a phase shifting circuit connected between said thyratron grid and said alternating current supply, a rectifier for producing a rectified voltage supply from said alternating current supply, a pair of potentiometers having the windings thereof connected across said rectified voltage supply, connections for connecting the variable contact of one of said potentiometers to said armature and the variable contact of the other of said potentiometers to said phase shifting circuit, switch means for disconnecting said motor and said thyratron, and mechanical means for operating said switch means at the limits of motion of said last mentioned variable contact.

7. A thyratron control system for controlling a direct current motor comprising a thyratron having an anode, a grid and a cathode, a direct current motor having an armature connected in series with said thyratron across an alternating current supply, a phase shifting circuit connected between said thyratron grid and said alternating current supply, a rectifier for producing a rectified voltage supply from said alternating current supply, a pair of potentiometers having the windings thereof connected across said rectified voltage supply, connections for connecting the variable contact of one of said potentiometers to said armature and the variable contact of the other of said potentiometers to said phase shifting circuit, means for reversing the current flow through said motor armature for reversing the direction of rotation of said motor armature, a manual switch for controlling said motor for forward rotation and a switch for controlling said last mentioned means to run said motor in reverse.

8. A thyratron control system for controlling a direct current motor comprising a thyratron having an anode, a grid and a cathode, a direct current motor having an armature connected in series with said thyratron across an alternating current supply, a phase shifting circuit connected between said thyratron grid and said alternating current supply, a second thyratron for reversing the current through said armature to reverse the direction of rotation thereof, a rectifier for producing a rectified voltage supply from said alternating current supply, a pair of relays having the windings thereof connected to said rectified voltage supply, potentiometers across said rectified voltage supply having variable contacts connected with said relays and connections for connecting the contacts of said relays to control the grid bias applied to said thyratrons.

9. A thyratron control system for controlling a direct current motor comprising a thyratron having an anode, a grid and a cathode, a direct current motor having an armature connected in series with said thyratron, an alternating current supply, a phase shifting circuit connected between said thyratron grid and said alternating current supply, a rectifier for producing a rectified voltage supply from said alternating current supply, a plurality of potentiometers having the windings thereof connected across said rectified voltage supply, connected for connecting the variable contact of one of said potentiometers to said armature and the variable contact of the other of said potentiometers to said phase shifting circuit, means for heating the cathode of said thyratron, means for connecting said thyratron anode to said alternating current supply and means to delaying the operation of said last mentioned means until said thyratron cathode is heated to operating temperature.

10. A control system comprising a thyratron having an anode, a grid, and a cathode, a direct current motor having an armature connected in series with the thyratron across an alternating current supply, a phase shifting circuit connected between the thyratron grid and an alternating current supply, a rectifier for producing a rectified voltage supply from an alternating current supply, a load holding potentiometer connected across the rectified voltage, a magnetic clutch for mechanically connecting the armature of the motor with the variable contact of the load holding potentiometer, a manual control potentiometer connected across the rectified voltage, a relay connecting the variable contact of the load holding potentiometer with the phase shifting circuit for automatic control of the grid bias, and switch means in the relay, said relay disconnecting the load holding potentiometer from the phase shifting circuit and the magnetic clutch and connecting the phase shifting circuit with the variable contact of the manual control potentiometer on operation of the switch means to permit manual control of the grid bias.

11. A control system comprising a thyratron having an anode, a grid, and a cathode, a direct current motor having an armature connected in series with the thyratron across an alternating current supply, a phase shifting circuit connected between the thyratron grid and an alternating current supply, a rectifier for producing a rectified voltage supply from an alternating current supply, a load holding potentiometer connected across the rectified voltage, a magnetic clutch for mechanically connecting the armature of the motor with the variable contact of the load holding potentiometer, a manual control potentiometer connected across the rectified voltage, a relay connecting the variable contact of the load holding potentiometer with the phase shifting circuit for automatic control of the grid bias, switch means in the relay, said relay disconnecting the load holding potentiometer from the phase shifting circuit and the magnetic clutch and connecting the phase shifting circuit with the variable contact of the manual control potentiometer on operation of the switch means to permit manual control of the grid bias, a reversing thyratron having a cathode grid, and anode connected to reverse the current through the armature, a reversing potentiometer connected across the rectified voltage source, a reversing relay manually connecting the grid of the reversing thyratron with the rectified voltage source to give the grid a negative bias preventing firing of the second thyratron, and switch means in the reversing relay connecting the grid of the reversing thyratron with the variable contact of the reversing potentiometer to reduce the negative bias on the grid of the reversing thyratron causing that thyratron to fire and turn the armature in a reverse direction.

12. A system for controlling a direct current motor comprising a thyratron having an anode, a grid, and a cathode, a direct current motor having an armature connected in series with the thyratron across an alternating current supply, said armature being connected to the cathode of the thyratron, a phase shifting circuit connected between the grid and an alternating current supply, a direct current supply, a pair of potentiometers connected across said direct current supply, the sliding contacts of each potentiometer being connected with the phase shifting circuit, one of said potentiometers having its sliding contact mechanically coupled to the shaft of the motor to control the motor automatically and relay controlled switches between the sliding contacts of the potentiometers and the phase shifting circuit whereby only one contact is connected with the phase shifting circuit at one time.

BERTHOLD A. KNAUTH.

REFERENCES CITED

The following references are of record in the file of this patent:

UNITED STATES PATENTS

| Number | Name | Date |
|---|---|---|
| 2,229,448 | Garman | Jan. 21, 1941 |
| 2,394,100 | Pettibone | Feb. 5, 1946 |
| 2,425,160 | Needham | Aug. 5, 1947 |

Certificate of Correction

Patent No. 2,576,518

November 27, 1951

BERTHOLD A. KNAUTH

It is hereby certified that error appears in the printed specification of the above numbered patent requiring correction as follows:

Column 1, line 8, for "illustrated" read *illustrate*; column 4, line 23, for "thyratron 25" read *thyratron 24*; column 5, line 57, for "42d" read *42b*; column 7, line 14, for "hold" read *halt*; column 10, line 42, for "connected" read *connections*;

and that the said Letters Patent should be read as corrected above, so that the same may conform to the record of the case in the Patent Office.

Signed and sealed this 12th day of February, A. D. 1952.

[SEAL]

THOMAS F. MURPHY,
*Assistant Commissioner of Patents.*